United States Patent
Jang et al.

(10) Patent No.: US 9,532,690 B2
(45) Date of Patent: Jan. 3, 2017

(54) ROBOT CLEANER AND CONTROL METHOD THEREOF

(71) Applicant: SAMSUNG ELECTRONICS CO., LTD., Suwon-si, Gyeonggi-do (KR)

(72) Inventors: Jae Hwi Jang, Yongin-si (KR); Young Jae Park, Suwon-si (KR); Sin Ae Kim, Suwon-si (KR); Won Kuk Kim, Seoul (KR); Hyo Won Sin, Anseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/560,719

(22) Filed: Dec. 4, 2014

(65) Prior Publication Data
US 2015/0208891 A1    Jul. 30, 2015

(30) Foreign Application Priority Data
Jan. 6, 2014   (KR) ................. 10-2014-0001564

(51) Int. Cl.
| | |
|---|---|
| A47L 9/26 | (2006.01) |
| B25J 9/00 | (2006.01) |
| B25J 5/00 | (2006.01) |
| A47L 9/28 | (2006.01) |
| A47L 5/22 | (2006.01) |

(Continued)

(52) U.S. Cl.
CPC .............. *A47L 9/2852* (2013.01); *A47L 5/225* (2013.01); *A47L 9/00* (2013.01); *A47L 9/04* (2013.01); *B25J 5/007* (2013.01); *B25J 9/0003* (2013.01); *A47L 2201/00* (2013.01); *A47L 2201/06* (2013.01); *Y10S 901/01* (2013.01)

(58) Field of Classification Search
CPC .......... A47L 9/2852; A47L 11/40; A47L 5/30; A47L 9/009; A47L 5/225; A47L 9/04; A47L 2201/00; A47L 2201/04; B25J 5/007; B25J 9/0003
See application file for complete search history.

(56) References Cited

U.S. PATENT DOCUMENTS

| | | |
|---|---|---|
| 5,309,592 A | 5/1994 | Hiratsuka |
| 5,720,077 A | 2/1998 | Nakamura et al. |

(Continued)

FOREIGN PATENT DOCUMENTS

| | | |
|---|---|---|
| JP | 2003-310509 | 11/2003 |

OTHER PUBLICATIONS

European Search Report issued May 20, 2015 in corresponding European Patent Application No. 14194403.3.

*Primary Examiner* — Dung Van Nguyen
(74) *Attorney, Agent, or Firm* — Staas & Halsey LLP

(57) ABSTRACT

A robot cleaner capable of vacuuming foreign materials on a floor includes a main body to which a dust collector is mounted and a vacuuming unit provided at a front portion of the main body to clean a floor. The vacuuming unit is configured to move relative to the main body. If it is determined that the robot cleaner is located near a wall or an obstacle, the vacuuming unit moves to the wall or the obstacle. Since the vacuuming unit contacts the wall or the obstacle, a region of a floor near the wall or the obstacle may be cleaned. Further, a manual cleaner may be selectively connected to a channel connector of the robot cleaner so that a user may choose automatic or manual cleaning of a floor at the user's convenience.

15 Claims, 13 Drawing Sheets

(51) Int. Cl.
*A47L 9/00* (2006.01)
*A47L 9/04* (2006.01)

(56) References Cited

U.S. PATENT DOCUMENTS

| | | | |
|---|---|---|---|
| 6,601,265 B1 * | 8/2003 | Burlington | A47L 5/28 15/319 |
| 6,904,989 B2 * | 6/2005 | Hefter | A47L 11/305 15/320 |
| 6,925,679 B2 * | 8/2005 | Wallach | A47L 5/36 15/319 |
| 7,113,847 B2 * | 9/2006 | Chmura | A47L 5/36 318/568.1 |

* cited by examiner

ROBOT CLEANER AND CONTROL METHOD THEREOF

CROSS-REFERENCE TO RELATED APPLICATIONS

This application claims the benefit of Korean Patent Application No. 10-2014-0001564, filed on Jan. 6, 2014 in the Korean Intellectual Property Office, the disclosure of which is incorporated herein by reference.

BACKGROUND

1. Field

One or more embodiments relate to a robot cleaner capable of vacuuming foreign materials on a floor and a control method of the same.

2. Description of the Related Art

A robot cleaner is a self-powered appliance utilizing an automatic travel function to clean a room or the like by vacuuming foreign materials, such as dust, from a floor of a room without user intervention. The robot cleaner detects a distance to an obstacle, such as furniture, office supplies, walls or the like, present in a zone to be cleaned using a distance sensor, and changes traveling directions by selectively driving a left-wheel motor and a right-wheel motor to perform cleaning of the zone to be cleaned.

A robot cleaner may be formed in a cylindrical shape. A cylindrical-shaped robot cleaner may have characteristics of smoothly changing traveling directions at a corner of a zone to be cleaned and being prevented from being caught by an obstacle.

A robot cleaner is provided with a vacuuming unit at a bottom surface thereof. A brush assembly may be rotatably mounted to a vacuuming unit. The brush assembly functions to collect dust on a floor and send the dust to the vacuuming unit. The vacuuming unit and the brush assembly may be disposed at a front or rear portion of the robot cleaner. In the case wherein the vacuuming unit and the brush assembly are disposed at a front or rear portion of the cylindrical-shaped robot cleaner, a specific region of a floor, such as a region near a wall, may not be cleaned although the robot cleaner travels on the specific region of a floor.

SUMMARY

The foregoing described problems may be overcome and/or other aspects may be achieved by one or more embodiments of a robot cleaner having a vacuuming unit that may be capable of moving left or right, thereby possibly minimizing a non-cleaned region.

The foregoing described problems may be overcome and/or other aspects may be achieved by one or more embodiments of a robot cleaner in which a channel connector may be provided at the vacuuming unit so that a connection hose of a manual cleaner may selectively communicate with a vacuuming channel.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

In accordance with one or more embodiments, a robot cleaner may include a main body to which a dust collector may be mounted and a vacuuming unit may be provided at a front portion of the main body to clean a floor. The vacuuming unit may be configured to move relative to the main body.

The robot cleaner may further include a movement device to move the vacuuming unit left or right with respect to the main body.

The movement device may include a pinion gear and a rack gear. The pinion gear may be provided at one of the main body and the vacuuming unit, and the rack gear may be provided at the other one of the main body and the vacuuming unit.

The main body may include an extension part provided with a straight part at a front portion thereof, and the vacuuming unit may be mounted to the extension part.

The vacuuming unit may include a vacuuming port to suck foreign materials on a floor and a connection part communicating with the vacuuming port, and the connection part and the dust collector may be connected by a vacuuming channel.

The vacuuming channel may be made of a flexible material such as, for example, a rubber material or the like.

The main body may be formed with a guide recess which may extend longitudinally in a left and right direction and along which the vacuuming channel may move left or right.

The vacuuming unit may be provided with a brush assembly to pick up foreign materials on a floor and to send the foreign materials to the vacuuming port.

The vacuuming unit may be provided with a damper at a left end portion or a right end portion thereof.

The damper may be a flexible tube made of, for example, a rubber material or the like.

The robot cleaner may further include a channel connector mounted to the vacuuming channel, by which the vacuuming channel selectively communicates with the connection part or an extension hose provided with a vacuuming head.

The channel connector may include a valve provided with an elastic member configured to apply elastic force to the valve to block the extension hose.

When the extension hose is inserted into the channel connector, the valve may be rotated so that the vacuuming channel communicates with the extension hose and the connection part is blocked.

The main body may be further provided with a torque sensor and a controller to control movement of the main body. The torque sensor may sense a direction and a magnitude of force applied to the extension hose and may transmit sensed information to the controller, and the controller may drive wheels to move the main body based on the information transmitted thereto.

In accordance with one or more embodiments, a method of controlling a robot cleaner, which may include a main body and a vacuuming unit configured to move relative to the main body. may include determining whether the robot cleaner is located near a wall or an obstacle, and upon determining that the robot cleaner is located near the wall or the obstacle, moving the vacuuming unit to the wall or the obstacle.

The method may further include moving the main body so that the vacuuming unit follows the wall or the obstacle after moving the vacuuming unit to the wall or the obstacle.

The method may further include upon determining that the robot cleaner is located near another wall or another obstacle during the following, returning the vacuuming unit to an original position, and moving the vacuuming unit to the other wall or the other obstacle so that the vacuuming unit follows the other wall or the other obstacle.

The method may further include determining whether an extension hose is connected to the main body, and upon determining that the extension hose is connected to the main body, converting a cleaning mode into a manual cleaning mode.

The converting the cleaning mode into the manual cleaning mode may include controlling the robot cleaner to travel corresponding to a direction and a magnitude of force applied to the main body by the extension hose.

As is apparent from the above description, since the vacuuming unit comes into contact with a wall of a zone to be cleaned, a region of a floor near the wall may be cleaned. Further, since a manual cleaner can be selectively connected to the channel connector of the robot cleaner, a user may choose automatic or manual cleaning of a floor at the user's convenience.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
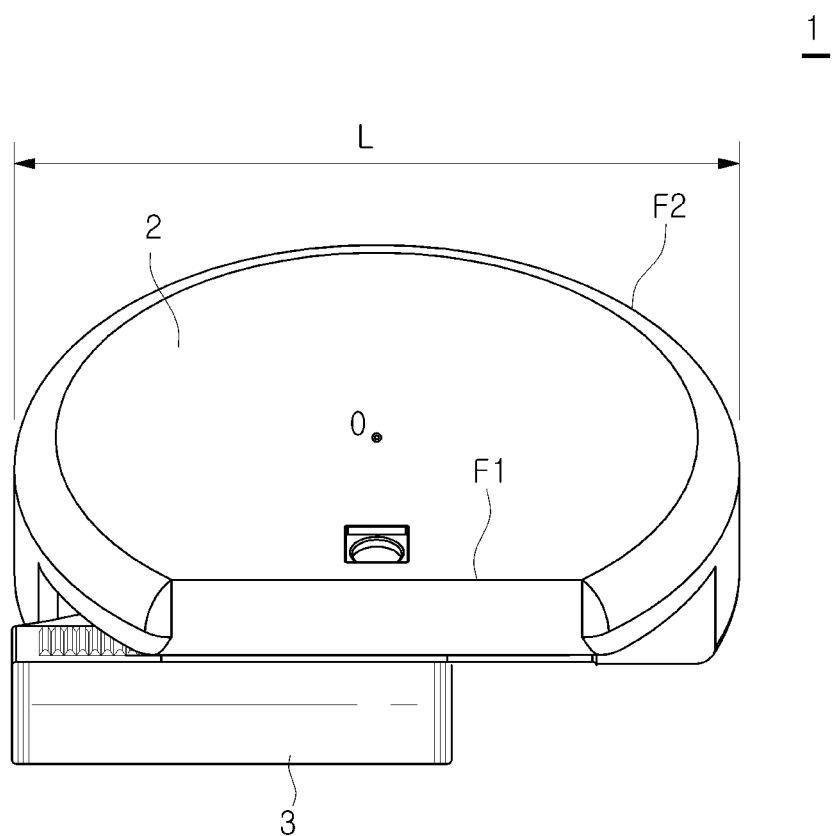
FIG. 1 is a perspective view illustrating a robot cleaner according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

Figure 2:
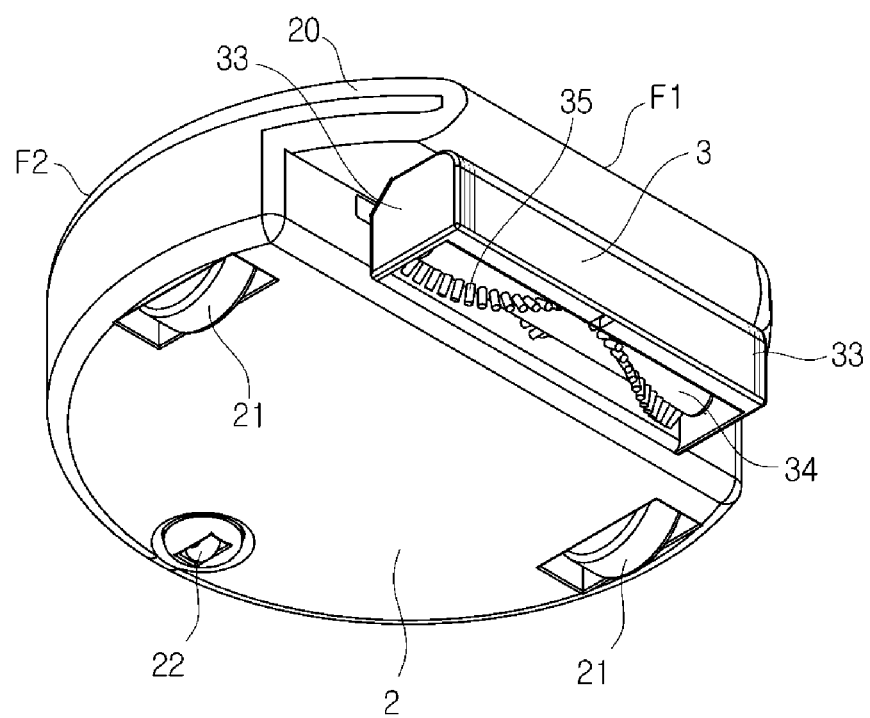
FIG. 2 is a view illustrating a bottom surface of a robot cleaner according to one or more embodiments.

FIG. 1 is a perspective view illustrating a robot cleaner according to one or more embodiments, and FIG. 2 is a view illustrating a bottom surface of a robot cleaner according to one or more embodiments.

Referring to FIGS. 1 and 2, a robot cleaner 1 according to one or more embodiments may include a main body 2 and a vacuuming unit 3. The vacuuming unit 3 may be configured to move relative to the main body 2. For example, the vacuuming unit 3 may be mounted to the main body 2 so as to move left or right. The main body 2 may be formed in a cylindrical shape, however, a portion of the main body 2 may be formed corresponding to the shape of a portion of the vacuuming unit 3.

The main body 2 may be formed in a cylindrical shape. In detail, the main body 2 may include a straight part F1 and a curved part F2. When a top surface of the main body 2 is observed from the above, the straight part F1 may be provided at a front portion of the main body 2 and the curved part F2 may be provided at side and rear portions of the main body 2. The curved part F2 may be a part of a circle, the center of which is any one point 0 on the main body 2.

A driving source to supply driving force to the robot cleaner 1 may be provided at the main body 2. The main body 2 may include a battery which may be electrically connected to the driving source and may supply driving power thereto. When the main body 2 is coupled to a docking station after cleaning is completed, the battery may be charged by receiving power from the docking station.

Wheels 21 may be provided at a bottom surface of the main body 2. By the wheels 21 driven by the driving source, the robot cleaner 1 may move forward and backward and rotate. The wheels 21 may be provided in a pair symmetrically arranged at left and right edge portions of a central region of the bottom surface of the main body 2. A caster 22 may be further provided at the bottom surface of the main body 2. The robot cleaner 1 may be stabilized by the caster 22. The caster 22 may be disposed at a front or rear portion of the bottom surface of the main body 2.

The vacuuming unit 3 may be configured to move relative to the main body 2. Hereinafter, one or more embodiments in which the vacuuming unit 3 moves left or right with respect to the main body 2 will be described. The vacuuming unit 3 may be disposed at the front portion of the main body 2. In particular, the vacuuming unit 3 may be disposed at the straight part F1 provided at the front portion of the main body 2. A front portion of the vacuuming unit 3 may be formed corresponding to the shape of the straight part F1.

An extension part 20, to which the vacuuming unit 3 may be mounted, may be provided at the front portion of the main body 2. In particular, the extension part 20 may be provided at a front upper portion of the main body 2. A front portion of the extension part 20 may be the straight part F1. The vacuuming unit 3 may be disposed beneath the extension part 20.

While the robot cleaner 1 travels forward, if the extension part 20 comes into contact with a wall having a larger area than the front surface of the extension part 20, the front surface of the extension part 20 including the straight part F1 may contact a wall. The vacuuming unit 3 may extend longitudinally in a left and right direction, and may be mounted to the front portion of the extension part 20. A front portion of the vacuuming unit 3 may protrude forward from the extension part 20.

The vacuuming unit 3 may vacuum foreign materials on a floor. A vacuum motor to generate vacuuming force may be provided inside the main body 2. Air sucked through the vacuuming unit 3 by the vacuum motor may move to a dust collector through a vacuum channel. A dust collector may separate foreign materials from air and to collect the foreign materials. The air from which foreign materials have been removed may be discharged outside through a discharge port. The dust collector may be, for example, a cyclone dust collector, but other types of dust collectors may be used.

Figure 3:
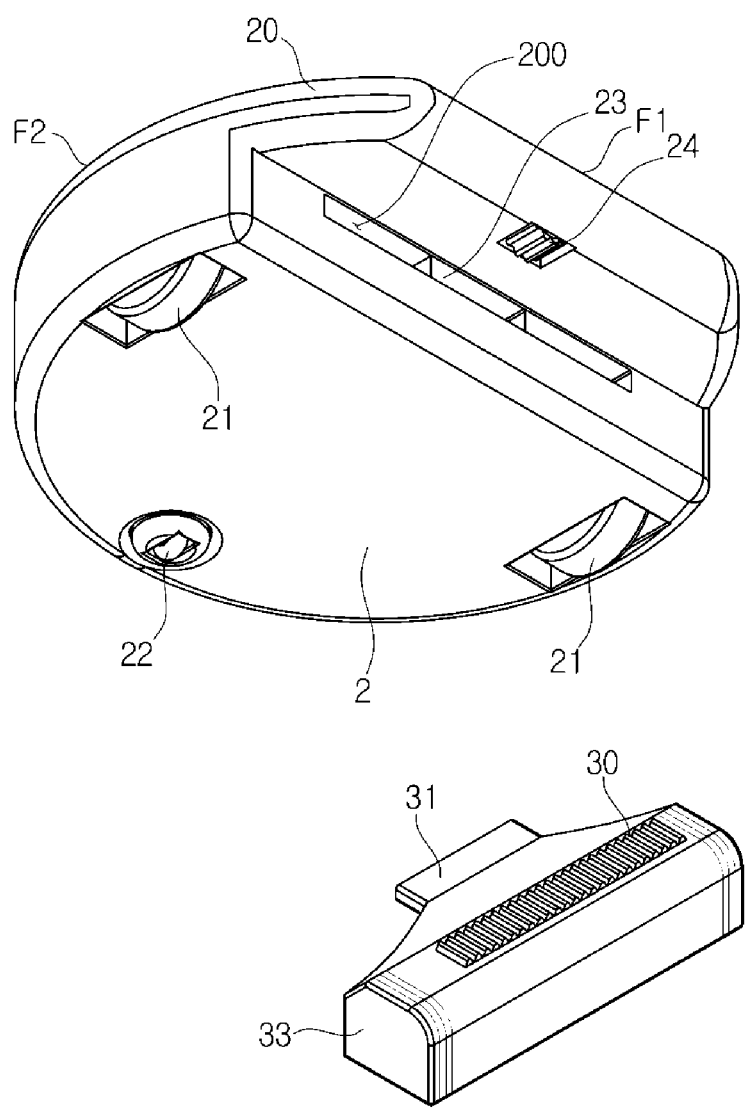
FIG. 3 is a view illustrating a robot cleaner according to one or more embodiments with a vacuuming unit separated therefrom.
Figure 4:
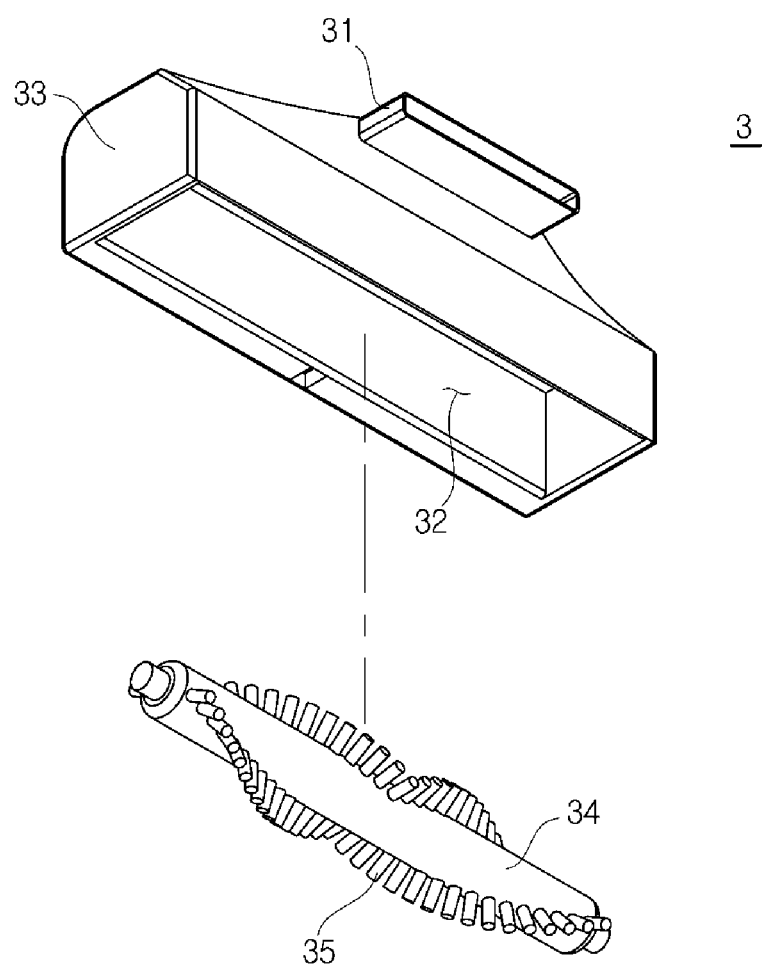
FIG. 4 is a view illustrating a vacuuming unit of a robot cleaner according to one or more embodiments.

FIG. 3 is a view illustrating a robot cleaner according to one or more embodiments with a vacuuming unit separated therefrom, and FIG. 4 is a view illustrating a vacuuming unit of the robot cleaner according to one or more embodiments.

Referring to FIGS. 3 and 4, the vacuuming unit 3 may be mounted to the front portion of the main body 2 and may be configured to move left or right. The vacuuming unit 3 may move within a range of a length L which may correspond to a diameter in a left and right direction of the main body 2.

The main body 2 may be formed with a vacuuming channel 23 which may communicate with the vacuuming unit 3. The vacuuming unit 3 may be provided with a connection part 31. The connection part 31 may be connected to the vacuuming channel 23. The connection part 31 may communicate with a vacuuming port 32. Air sucked through the vacuuming port 32 may move to the dust collector through the connection part 31 and the vacuuming channel 23.

The vacuuming channel 23 may be made of a flexible material. For instance, the vacuuming channel 23 may be made of a rubber material.

The vacuuming channel 23 may be structured such that one end thereof moves left or right together with the vacuuming unit 3. Although the vacuuming unit 3 moves left or right, connection between the vacuuming channel 23 and the connection part 31 may not be released. One end of the vacuuming channel 23 may move left or right together with the connection part 31.

The main body 2 may be formed with a guide recess 200. The vacuuming channel 23 and the connection part 31 may be connected to each other through the guide recess 200. The guide recess 200 may extend longitudinally in a left and right direction. The vacuuming channel 23 and the connection part 31 of the vacuuming unit 3 may move left or right along the guide recess 200. For example, the guide recess 200 may be formed at a surface of the front portion of the main body 2 at which the extension part 20 is provided. The guide recess 200 may be disposed below the extension part 20.

A movement device may be provided at the main body 2 or the vacuuming unit 3. The movement device may be driven by a motor provided at the main body 2. The movement device may be configured to move the vacuuming unit 3 left or right. For example, a first movement device may be provided at the main body 2, and a second movement device may be provided at the vacuuming unit 3. The first movement device may be driven by the motor to move the second movement device left or right, thereby moving the vacuuming unit 3 left or right.

For example, the first movement device may be a pinion gear 24, and the second movement device may be a rack gear 30. Conversely, the first movement device may be a rack gear, and the second movement device may be a pinion gear. Hereinafter, one or more embodiments in which the first movement device is the pinion gear 24 and the second movement device is the rack gear 30 will be described.

In detail, the pinion gear 24 may be provided at the main body 2. The pinion gear 24 may be rotated by the motor. The rack gear 30 may be provided at the vacuuming unit 3. The rack gear 30 may be tooth-engaged with the pinion gear 24. If the pinion gear 24 tooth-engaged with the rack gear 30 rotates clockwise or counterclockwise by the motor, the vacuuming unit 3 provided with the rack gear 30 may move left or right. The pinion gear 24 may be disposed at the front portion of the main body 2. The rack gear 30 may be disposed at the upper outer surface or rear outer surface of the vacuuming unit 3. The rack gear 30 may extend in a longitudinal direction of the vacuuming unit 3.

When the robot cleaner 1 is positioned near a wall or an obstacle, a controller 1010 may activate the motor to rotate the pinion gear 24. The vacuuming unit 3 provided with the rack gear 30 may move left or right by the pinion gear 24 and thus may move to contact a wall or an obstacle. The vacuuming unit 3 may move left or right until the vacuuming unit 3 comes into contact with a wall or an obstacle.

The vacuuming unit 3 may be provided with dampers 33 at left and right end portions thereof. When the vacuuming unit 3 moves left or right by the pinion gear 24 and the rack gear 30, the left end portion or right end portion of the vacuuming unit 3 may collide with a wall or an obstacle. The dampers 33 provided at the left and right end portions of the vacuuming unit 3 may serve to absorb shock which may be generated when the vacuuming unit 3 collides with a wall or an obstacle. The dampers 33 may be a flexible tube made, for example, of sponge, rubber or the like.

A brush assembly may be rotatably provided in an inner space of the vacuuming unit 3. The vacuuming port 32 may be formed at a portion of the inner space of the vacuuming unit 3. The brush assembly may pick up foreign materials on a floor and may send the same to the vacuuming port 32. Foreign materials picked up by the brush assembly may be vacuumed through the vacuuming port 32 and may move to the dust collector provided inside the robot cleaner 1.

The brush assembly may include a shaft 34 that may be configured to be rotated by the motor and a brush 35 that may be provided at an outer peripheral surface of the shaft 34. The brush 35 may be formed in a spiral shape on the outer peripheral surface of the shaft 34. Foreign materials picked up by the brush 35 may be vacuumed through the vacuuming port 32.

A conventional cylindrical robot cleaner is structured such that a vacuuming port is positioned biased from a center portion. A roller brush provided at the vacuuming port is configured to rotate to pick up foreign materials on a floor. The roller brush extends in a left and right direction and picks up foreign materials on a floor. Since the roller brush is positioned apart from the center portion of the robot cleaner, a length of the roller brush is less than a diameter of the robot cleaner. As described above, if the length of the roller brush is less than the diameter of the robot cleaner, in the case in which the robot cleaner travels near a wall or an obstacle, the roller brush may not contact some region of a floor. The region of a floor which the roller brush does not contact may not be cleaned although the robot cleaner travels on the region of a floor.

In contrast, robot cleaner 1 according to one or more embodiments may be structured such that the vacuuming unit 3 is configured to move left or right. Accordingly, even when the robot cleaner 1 travels near a wall or an obstacle, the vacuuming unit 3 may move left or right, thereby possibly cleaning a region of a floor adjacent to a wall or an obstacle.

Figure 5A:
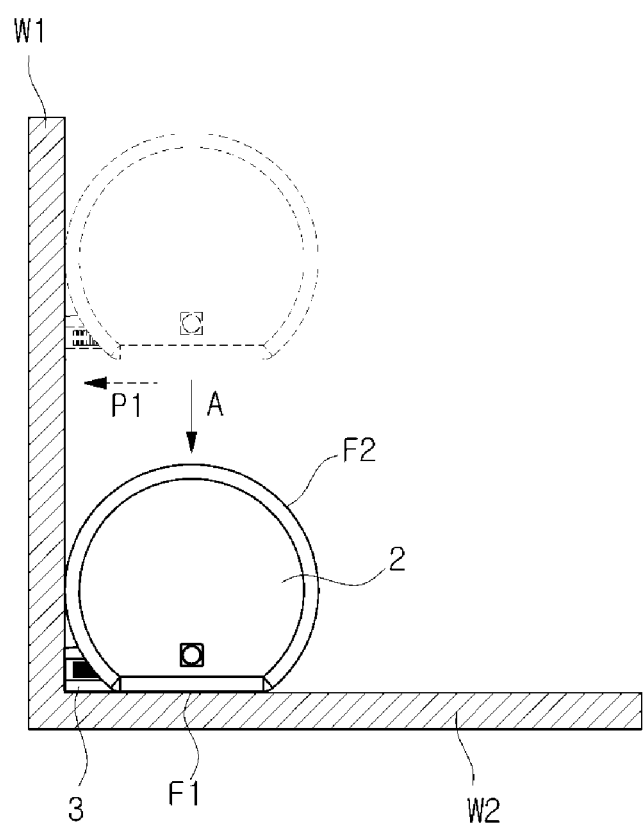
FIGS. 5a through 5c are views illustrating a state wherein a robot cleaner according to one or more embodiments changes traveling directions at a corner.
Figure 5B:
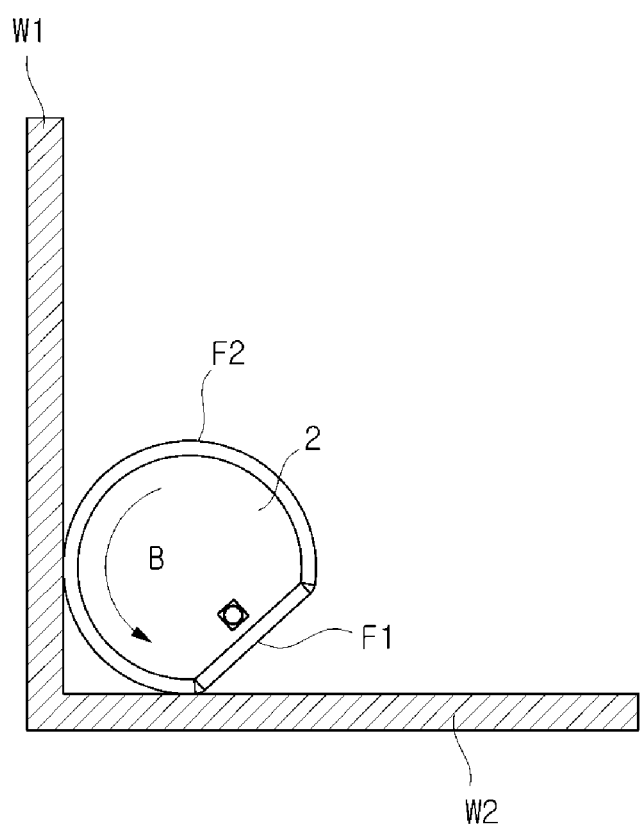
Figure 5C:
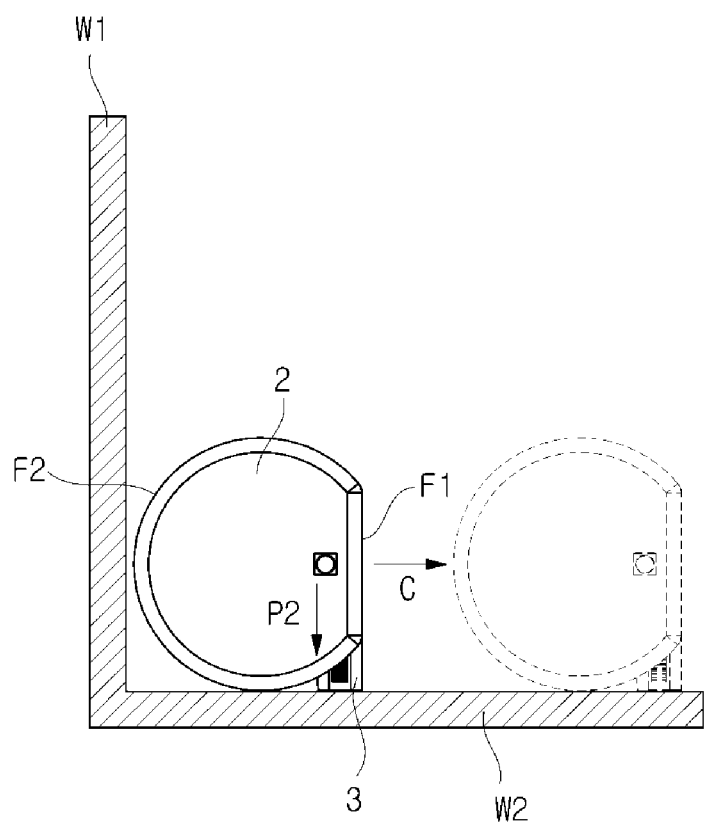

FIGS. 5a through 5c are views illustrating a state wherein a robot cleaner according to one or more embodiments changes traveling directions at a corner.

Referring to FIGS. 5a through 5c, if a wall or an obstacle is sensed, the robot cleaner 1 may perform cleaning while possibly optimizing the position of the vacuuming unit 3. an obstacle sensor 1030 may be provided at a side surface of the robot cleaner 1 in order to sense an obstacle. The obstacle sensor 1030 may be provided plural in number along the periphery of the robot cleaner 1.

If it is sensed that the robot cleaner 1 is positioned adjacent to one or more walls or obstacles by the obstacle sensor 1030, the vacuuming unit 3 may move toward a wall or an obstacle. Hereinafter, the case in which a first wall W1 is positioned at the right of the traveling direction of the robot cleaner 1 and the vacuuming unit 3 moves in a direction P1 toward the first wall W1 will be explained. The vacuuming unit 3 may move in the direction P1 toward the first wall W1 and may contact the first wall W1. Shock generated by contact of the vacuuming unit 3 with the first wall W1 may be absorbed by the dampers 33.

If the vacuuming unit 3 contacts the first wall W1, the robot cleaner 1 may travel straight in a direction A. If it is not sensed that the first wall W1 is adjacent to the robot cleaner 1 by the obstacle sensor 1030, the vacuuming unit 3 may be positioned inside the robot cleaner 1, and the robot cleaner 1 may travel in the direction A to clean a floor. As described above, after the vacuuming unit 3 moves to a wall to contact the same, the robot cleaner 1 may travel so that the vacuuming unit 3 follows a wall.

When the robot cleaner 1 moving straight in the direction A reaches a corner, the straight part F1 of the extension part 20 disposed at the front portion of the robot cleaner 1 may come into contact with a second wall W2 forming a corner. The vacuuming unit 3 provided at the front portion of the robot cleaner 1 may clean a floor while the robot cleaner 1 travels straight in the direction A until the robot cleaner 1 comes into contact with the second wall W2 forming a corner. If it is sensed that the robot cleaner 1 is positioned adjacent to the second wall W2 by the obstacle sensor 1030, the straight movement of the robot cleaner 1 in the direction A may be stopped.

As described above, since the straight part F1 is provided at the front portion of the robot cleaner 1 and the robot cleaner 1 travels until the robot cleaner 1 comes into contact with a wall or an obstacle located in front of the robot cleaner 1 or a wall or an obstacle is detected to be located near the front portion of the robot cleaner 1, the vacuuming unit 3 of the robot cleaner 1 may completely clean a forward zone. In the case wherein the robot cleaner 1 performs cleaning while moving along a wall or an obstacle, the vacuuming unit 3 moves out of the robot cleaner 1 so as to contact a wall or an obstacle, thereby securely cleaning a region of a floor adjacent to a wall or an obstacle. Accordingly, a region which is not cleaned although the robot cleaner travels thereon may be minimized.

If the second wall W2 is detected to be located in front of the robot cleaner 1 or the robot cleaner 1 contacts the second wall W2, the robot cleaner 1 may stop moving in the direction A, and the vacuuming unit 3 may move inward of the main body 2. If the vacuuming unit 3 moves inward of the main body 2, the robot cleaner 1 may rotate in a direction B. Due to the curved part F2, the robot cleaner 1 may easily rotate at a corner formed by the first wall W1 and the second wall W2. In other words, since the most part of the robot cleaner 1 except a part of the front portion is formed in a cylindrical shape, the robot cleaner 1 may easily rotate in the direction B at a corner formed by the first wall W1 and the second wall W2.

After the robot cleaner 1 rotates in the direction B, the vacuuming unit 3 may move right (in a direction P2) so as to contact the second wall W2. If the vacuuming unit 3 contacts the second wall W2, the robot cleaner 1 may travel forward (in a direction C) along the second wall W2 and may clean a floor.

If the second wall W2 is detected to be located in front of the robot cleaner 1, the vacuuming unit 3 may return to an original position. The traveling mode of the robot cleaner 1 may be converted into a second wall following mode. In the state in which the vacuuming unit 3 is in contact with the second wall W2, the robot cleaner 1 may follow the second wall W2.

As described above, the robot cleaner 1 may clean the whole floor while reducing a non-cleaned area. In the case wherein a corner or an obstacle is located in front of the robot cleaner 1, the robot cleaner 1 may easily change traveling directions by rotating.

Figure 6:
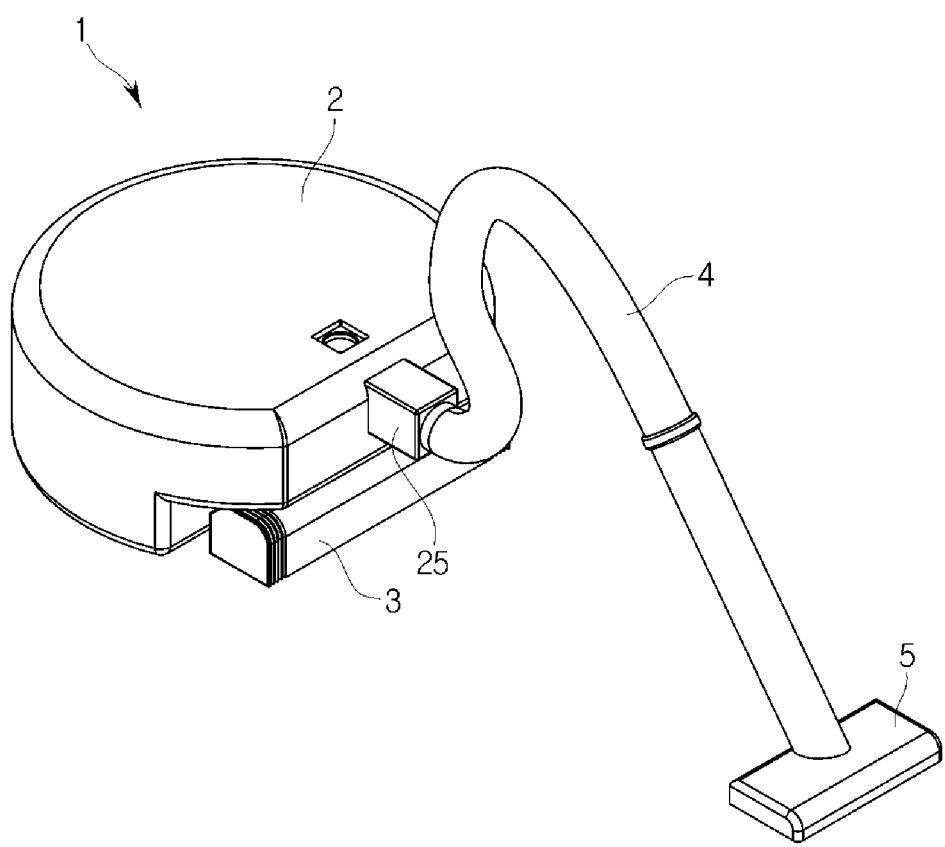
FIG. 6 is a view illustrating a robot cleaner according to one or more embodiments to which an extension hose is connected.

FIG. 6 is a view illustrating a robot cleaner according to one or more embodiments to which an extension hose is connected.

Referring to FIG. 6, a user may manipulate the robot cleaner 1 according to one or more embodiments to automatically clean a floor, and may also manually clean a floor with the robot cleaner 1. In the case wherein a user manually cleans a floor, an extension hose 4 provided with a vacuuming head 5 may be mounted to the robot cleaner 1. Foreign materials on a floor may be sucked through the vacuuming head 5.

A user may clean a floor by grabbing a knob (not shown) provided at the extension hose 4. If the extension hose 4 is mounted to the robot cleaner 1, the extension hose 4 may communicate with the vacuuming channel 23 provided at the robot cleaner 1. The vacuuming channel 23 may selectively communicate with the vacuuming unit 3 or the extension hose 4 mounted to the robot cleaner 1.

Hereinafter, a channel connector 6 configured to allow the vacuuming channel 23 to selectively communicate with the vacuuming unit 3 or the extension hose 4 will be described with reference to the drawings.

Figure 7:
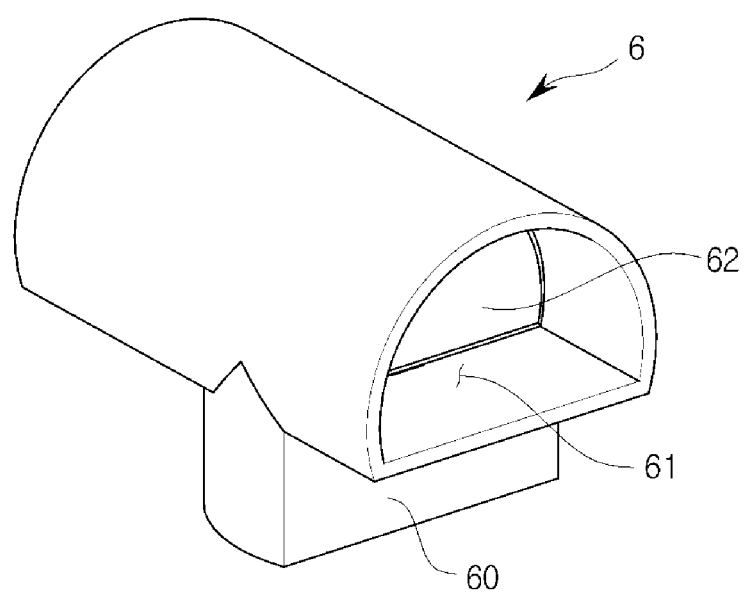
FIG. 7 is a view illustrating a channel connector of a robot cleaner according to one or more embodiments.
Figure 8A:
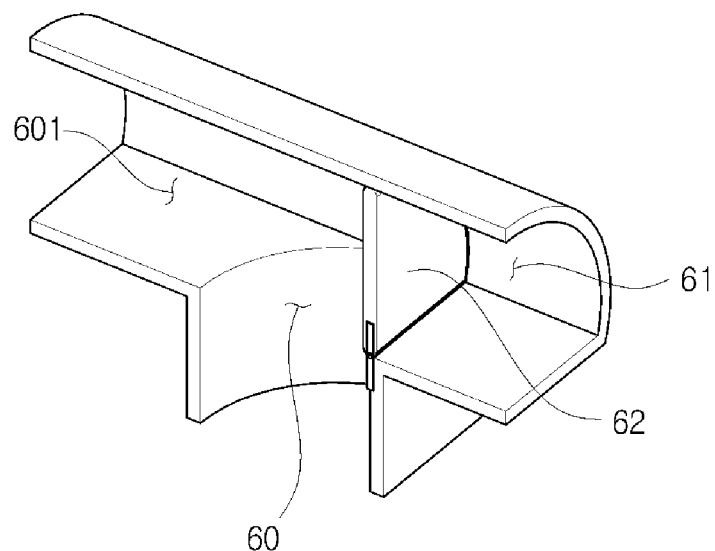
FIG. 8a is a view illustrating the channel connector in an automatic cleaning mode of a robot cleaner according to one or more embodiments.
Figure 8B:
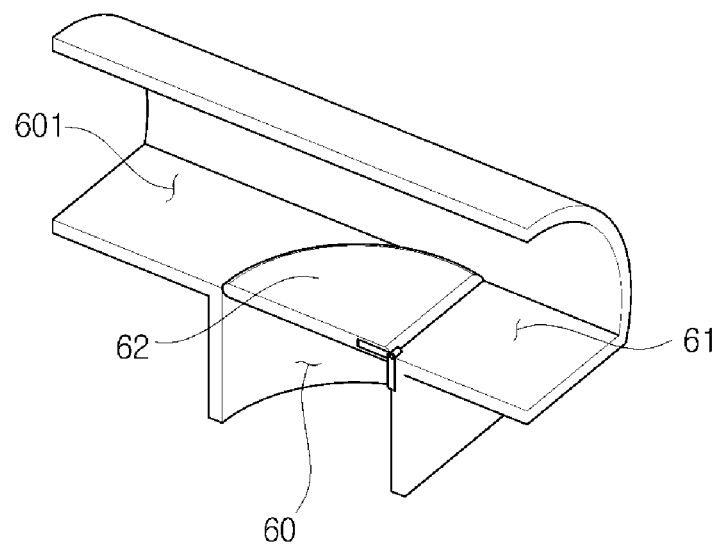
FIG. 8b is a view illustrating a channel connector in a manual cleaning mode of a robot cleaner according to one or more embodiments.
Figure 10:
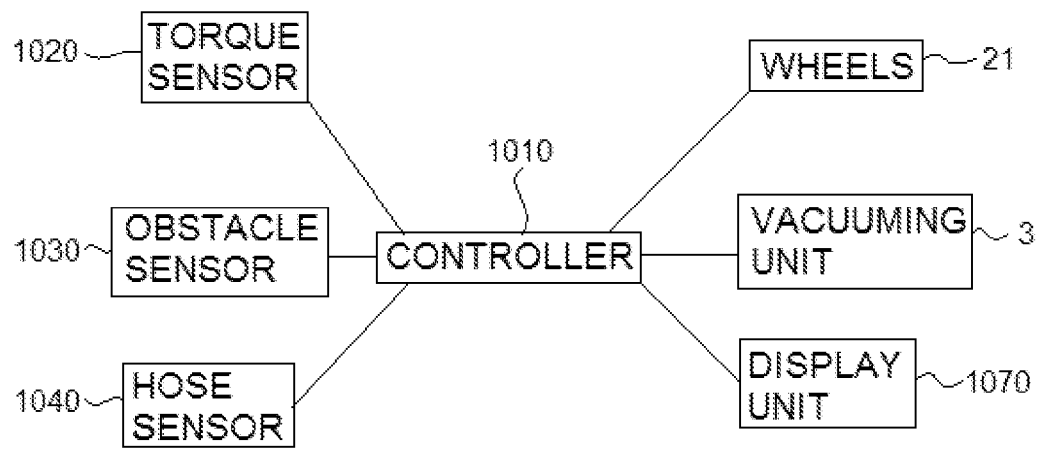
FIG. 10 is a block diagram illustrating a robot cleaner according to one or more embodiments.

FIG. 7 is a view illustrating a channel connector of a robot cleaner according to one or more embodiments, FIG. 8a is a view illustrating a channel connector in an automatic cleaning mode of a robot cleaner according to one or more embodiments, and FIG. 8b is a view illustrating a channel connector in a manual cleaning mode of a robot cleaner according to one or more embodiments. FIG. 10 is a block diagram illustrating a robot cleaner according to one or more embodiments.

Referring to FIGS. 7 through 8b, the vacuuming channel 23 of the robot cleaner 1 may selectively communicate with the vacuuming unit 3 or the extension hose 4 by the channel connector 6. The channel connector 6 may be provided with a valve 62 to selectively open and close a channel for the vacuuming unit 3 or a channel for the extension hose 4.

The channel connector 6 may include a first channel 60 and a second channel 61. The first channel 60 or the second channel 61 may be selectively opened and closed by the valve 62. The first channel 60 may be connected to the vacuuming unit 3. In this case, the first channel 60 and the vacuuming unit 3 may be connected by a flexible connection tube so that left and right movement of the vacuuming unit is not affected. Alternatively, the channel connector 6 may be mounted to the vacuuming unit 3 so as to move with the vacuuming unit 3. The second channel 61 may be connected to the extension hose 4.

The channel connector 6 may be formed in a T or Y shape. One end portion of the second channel 61 may be mounted to the vacuuming channel 23. The extension hose 4 may be mounted to the other end portion of the second channel 61.

The first channel 60 may be branched from the second channel 61. In the case wherein the valve 62 is removed, the first channel 60 and the second channel 61 may communicate with each other.

The valve 62 may be mounted to a junction of the first channel 60 and the second channel 61. If a channel of the channel connector 6, to which the vacuuming channel 23 is mounted, is referred to as a third channel 601, when the valve 62 blocks the first channel 60, the third channel 601 may communicate with the second channel 61. When the valve 62 blocks the second channel 61, the third channel 601 may communicate with the first channel 60. As described above, the valve 62 may allow the third channel 601 to selectively communicate with the first channel 60 or the second channel 61.

The valve 62 may be configured to automatically open and close the first channel 60 or the second channel 61 through an electrical mechanism. The valve 62 may also be configured to open and close the first channel 60 or the second channel 61 through a mechanical mechanism using an elastic member.

For instance, the valve 62 may be mounted to a side wall of the channel connector 6, at a junction of the first channel 60 and the second channel 61, using an elastic member. If an external force is not applied to the valve 62, the valve 62 may keep blocking the second channel 61 by the elastic member. At this time, the first channel 60 and the third channel 601 may communicate with each other. When the extension hose 4 is mounted to the second channel 61, an external force may be applied to the valve 62 by the extension hose 4. Since the extension hose 4 inserted into the second channel 61 pushes the valve 62, the valve 62 may rotate about a hinge shaft so that the second channel 61 and the third channel 601 may communicate with each other and communication of the third channel 601 with the first channel 60 may be blocked.

In the case wherein the robot cleaner 1 automatically cleans a floor, the valve 62 may allow communication of the third channel 601 with the first channel 60 and block communication of the third channel 601 with the second channel 61. In the case wherein a user manually cleans a floor with the robot cleaner 1, the valve 62 may allow communication of the third channel 601 with the second channel 61 and block communication of the third channel 601 with the first channel 60. As described above, since the first channel 60 or the second channel 61 selectively communicates with the vacuuming channel 23 by the valve 62, foreign materials sucked in an automatic cleaning mode or a manual cleaning mode may be prevented from being leaked through a portion of the channel connector 6, and cleaning efficiency of the robot cleaner 1 may be enhanced.

Figure 9:
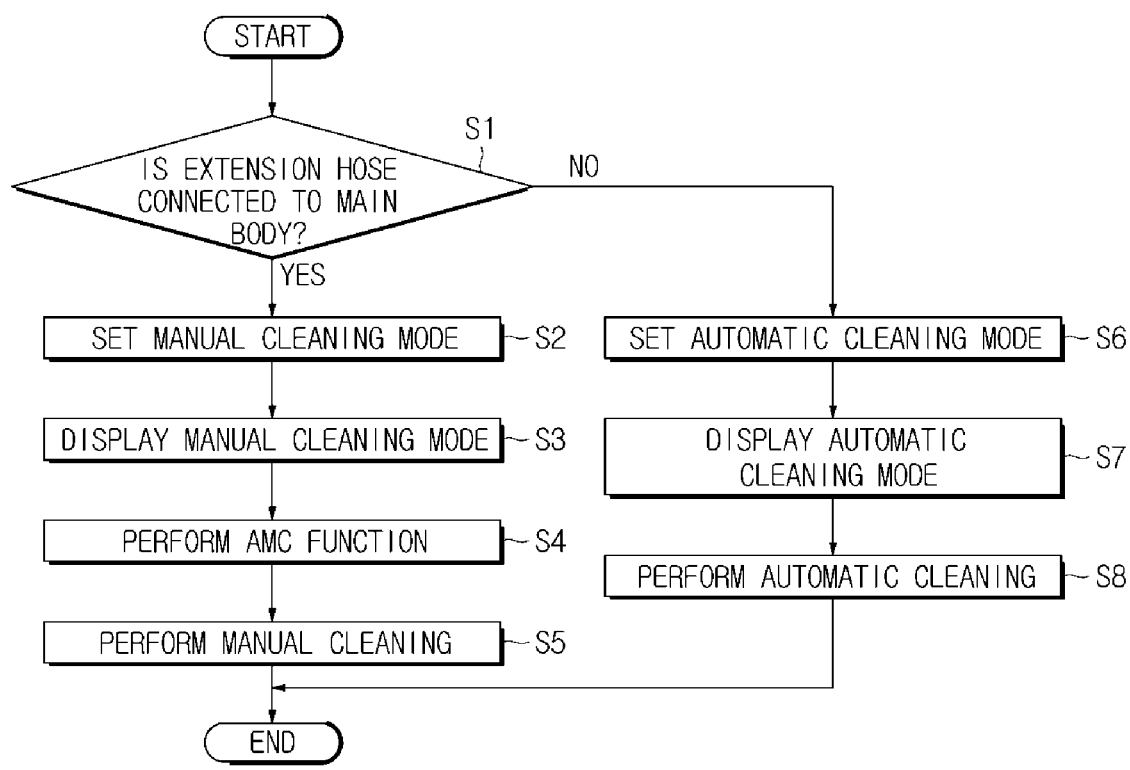
FIG. 9 is a flowchart illustrating a control method of a robot cleaner according to one or more embodiments.

FIG. 9 is a flowchart illustrating a control method of the robot cleaner according to the exemplary embodiment of the present invention.

Referring to FIG. 9, an automatic cleaning mode or a manual cleaning mode of the robot cleaner 1 may be set according to whether the extension hose 4 is connected to the main body 2 at operation S1. Connection of the extension hose 4 to the main body 2 may be detected by a hose sensor 1040. Information detected by the hose sensor 1040 may be transmitted to a controller 1010.

If it is detected that the extension hose 4 is connected to the main body 2 by the hose sensor 1040, the controller 1010 may set a manual cleaning mode in which a user cleans a floor by manually manipulating the robot cleaner 1 at operation S2. If a cleaning mode of the robot cleaner 1 is set to a manual cleaning mode, the controller 1010 may display the manual cleaning mode on a display unit 1070 at operation S3. In the case of a manual cleaning mode, the controller 1010 may perform an advanced motion control (AMC) function at operation S4. By virtue of the AMC function, a user may easily move the main body 2 of the robot cleaner 1. Because a robot cleaner having high vacuuming power may be equipped with a high capacity battery and a high output motor, a volume and a weight may be increased. The AMC function may help a user to easily move the main body 2 of the robot cleaner 1.

In order to realize the AMC function, the robot cleaner 1 may be equipped with a torque sensor 1020. The torque sensor 1020 may sense a magnitude and a direction of user's force pulling the extension hose 4. Based on the magnitude and the direction of the force sensed by the torque sensor 1020, the controller 1010 may activate a motor connected to the wheels 21. The wheels 21 may be driven so that the robot cleaner 1 may move in the direction of the force sensed by the torque sensor 1020. Further, the wheels 21 may be driven so that a moving speed of the robot cleaner 1 may be adjusted according to the magnitude of the force sensed by the torque sensor 1020.

By the above-described AMC function, a user may move the robot cleaner 1 in a desired direction. Although the robot cleaner 1 may have a large volume and weight because of a large capacity battery and a high output motor, a user may easily move the robot cleaner 1 by pulling the extension hose 4 connected to the robot cleaner 1 in a desired direction.

If it is not detected that the extension hose 4 is connected to the main body 2 by the hose sensor 1040, the controller 1010 may set an automatic cleaning mode in which the robot cleaner 1 automatically cleans a floor at operation S6. If a cleaning mode of the robot cleaner 1 is set to an automatic cleaning mode, the controller 1010 may display the automatic cleaning mode on the display unit 1070 at operation S7. After the automatic cleaning mode is displayed on the display unit 1070, the robot cleaner 1 may automatically travel to clean a floor at operation S8.

As described above, since the robot cleaner 1 may include the vacuuming unit 3 capable of moving in a left and right direction, the robot cleaner 1 may clean a region of a floor near a wall or an obstacle. Accordingly, a non-cleaned area of a floor may be minimized. In addition, since the extension hose 4 provided with the vacuuming head 5 may be connected to the robot cleaner 1, a user may manually clean a floor with the robot cleaner 1. Further, the vacuuming channel 23 of the robot cleaner 1 may be provided with the channel connector 6 including the valve 62 to selectively open and close a channel for the vacuuming unit 3 or a channel for the extension hose 4 so that the vacuuming channel 23 selectively communicates with the vacuuming unit 3 or the extension hose 4.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A robot cleaner comprising:
   a dust collector;
   a main body mounted to the dust collector;
   a vacuuming unit provided at a front portion of the main body, the vacuuming unit being configured to clean a floor; and
   a movement device including a pinion gear and a rack gear, the movement device being configured to move the vacuuming unit with respect to the main body, wherein the pinion gear is provided on one of the main body and the vacuuming unit, and the rack gear is provided on another one of the main body and the vacuuming unit, and
   wherein the vacuuming unit is configured to move relative to the main body.

2. The robot cleaner according to claim 1, wherein the main body includes an extension part comprising a straight part at a front portion thereof, and the vacuuming unit is mounted to the extension part.

3. The robot cleaner according to claim 1, wherein the vacuuming unit includes
   a vacuuming port configured to suction foreign materials from the floor and
   a connection part communicating with the vacuuming port, and
   wherein the connection part and the dust collector are connected by a vacuuming channel.

4. The robot cleaner according to claim 3, wherein the vacuuming channel is made of a flexible rubber material.

5. The robot cleaner according to claim 3, wherein the main body is formed with a guide recess which extends longitudinally in a left direction and a right direction and along which the vacuuming channel moves left or right.

6. The robot cleaner according to claim 3, wherein the vacuuming unit is provided with a brush assembly configured to pick up foreign materials off of the floor and to send the foreign materials to the vacuuming port.

7. The robot cleaner according to claim 1, wherein the vacuuming unit is provided with a damper at a left end portion or a right end portion thereof.

8. The robot cleaner according to claim 7, wherein the damper is a flexible tube made of a rubber material.

9. A robot cleaner comprising:
   a dust collector;
   a main body mounted to the dust collector;
   a vacuuming unit provided at a front portion of the main body, the vacuuming unit being configured to clean a floor and being configured to move relative to the main body, the vacuuming unit including
      a vacuuming port configured to provide suction to remove foreign materials off of the floor,
      a connection part communicating with the vacuuming port, and
      a vacuuming channel connecting the connection part and the dust collector; and
   a channel connector mounted to the vacuuming channel, the channel connector configured to cause the vacuuming channel to selectively communicate with the connection part or an extension hose provided with a vacuuming head.

10. The robot cleaner according to claim 9, wherein the channel connector comprises a valve provided with an elastic member configured to apply elastic force to the valve to block communication with the extension hose.

11. The robot cleaner according to claim 10, wherein when the extension hose is inserted into the channel connector, the valve is rotated so that the vacuuming channel communicates with the extension hose and blocks communication with the connection part.

12. The robot cleaner according to claim 11, wherein:
   the main body further comprises a torque sensor and a controller to control movement of the main body,
   the torque sensor senses information, which corresponds to a direction and a magnitude of force applied to the extension hose, and transmits the sensed information to the controller, and the controller drives wheels mounted on the main body to move the main body based on the sensed information transmitted from the torque sensor.

13. A robot cleaner comprising:
a dust collector;
a main body mounted to the dust collector;
a vacuuming unit provided at a front portion of the main body, the vacuuming unit being configured to clean a floor;
a movement device including a pinion gear and a rack gear, the movement device being configured to move the vacuuming unit with respect to the main body, the pinion gear being provided on one of the main body and the vacuuming unit and the rack gear being provided on another one of the main body and the vacuuming unit;
a vacuuming channel connecting the vacuuming unit and the dust collector; and
a channel connector mounted to the vacuuming channel, the channel connector being configured to cause the vacuuming channel to selectively communicate with the connection part or an extension hose.

14. The robot cleaner according to claim 13, wherein the channel connector comprises a valve provided with an elastic member configured to apply elastic force to the valve to block communication with the extension hose.

15. The robot cleaner according to claim 14, wherein when the extension hose is inserted into the channel connector, the valve is rotated so that the vacuuming channel communicates with the extension hose and blocks communication with the connection part.

* * * * *